(12) United States Patent
Ratcliff et al.

(10) Patent No.: US 6,772,221 B1
(45) Date of Patent: Aug. 3, 2004

(54) DYNAMICALLY CONFIGURING AND MONITORING HOSTS CONNECTED IN A COMPUTING NETWORK HAVING A GATEWAY DEVICE

(75) Inventors: Bruce H. Ratcliff, Red Hook, NY (US); Christopher B. Larsson, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,909

(22) Filed: Feb. 17, 2000

(51) Int. Cl.[7] ............................................. G06F 15/16
(52) U.S. Cl. ....................... 709/238; 709/235; 709/239; 709/241; 709/242; 370/395.31; 370/395.32; 370/401; 370/411
(58) Field of Search ................................. 709/235, 238, 709/239, 241, 242; 370/395.31, 395.32, 401, 411

(56) References Cited

U.S. PATENT DOCUMENTS

| | | | |
|---|---|---|---|
| 5,974,049 A | | 10/1999 | Ratcliff et al. ............... 370/401 |
| 5,987,515 A | | 11/1999 | Ratcliff et al. ............... 709/224 |
| 5,999,536 A | * | 12/1999 | Kawafuji et al. ........... 370/401 |
| 6,003,080 A | | 12/1999 | Ratcliff et al. ............... 709/224 |
| 6,003,088 A | | 12/1999 | Houston et al. ............ 709/230 |
| 6,006,261 A | | 12/1999 | Ratcliff et al. ............... 709/224 |
| 6,009,467 A | | 12/1999 | Ratcliff et al. ............... 709/224 |
| 6,014,699 A | | 1/2000 | Ratcliff et al. ............... 709/224 |
| 6,014,753 A | * | 1/2000 | Miyamoto et al. |
| 6,023,734 A | | 2/2000 | Ratcliff et al. ............... 709/300 |
| 6,061,334 A | * | 5/2000 | Berlovitch et al. |
| 6,101,549 A | * | 8/2000 | Baugher et al. ............ 709/238 |
| 6,185,218 B1 | * | 2/2001 | Ratcliff et al. ............... 709/238 |
| 6,310,876 B1 | * | 10/2001 | Egbert |
| 6,330,615 B1 | * | 12/2001 | Gioquindo et al. |
| 6,338,089 B1 | * | 1/2002 | Quinlan |
| 6,359,894 B1 | * | 3/2002 | Hong et al. |
| 6,430,595 B1 | * | 8/2002 | Ferguson et al. |
| 6,446,112 B1 | * | 9/2002 | Bunney et al. |
| 6,490,285 B2 | * | 12/2002 | Lee et al. ..................... 370/401 |
| 6,507,873 B1 | * | 1/2003 | Suzuki et al. |

OTHER PUBLICATIONS

M. Allen; RFC 1634; May, 1994, all.*

* cited by examiner

Primary Examiner—Rupal Dharia
Assistant Examiner—Stephan Willett
(74) Attorney, Agent, or Firm—Floyd A. Gonzalez; Lily Neff

(57) ABSTRACT

In a computing network environment having a gateway device electronically connected to a plurality of hosts potentially connected to one or more routers and local area networks, a method and apparatus is provided for dynamically configuring, deconfiguring and monitoring all connected hosts. Special IPX commands are provided to add or remove information about hosts in a routing table. The command provides information about the connected hosts' IPX sessions, router information and IPX packets and their final destinations, and connection routes. In another embodiment of the present invention the IPX command is also used to receive information and pass information about new IPX stations in the network environment. By providing a counter and incrementing it each time an IPX packet is received from the network, the most used entries are identified.

A second special IPX host command is also provided for deconfiguring and removing entries from the routing table in a manner similar to the one described above.

35 Claims, 5 Drawing Sheets

DYNAMICALLY CONFIGURING AND MONITORING HOSTS CONNECTED IN A COMPUTING NETWORK HAVING A GATEWAY DEVICE

INCORPORATION BY REFERENCE

The present application is related to and incorporates by reference the following applications: U.S. Pat. No. 5,974,049, Issued: Oct. 26, 1999, entitled "Internet Protocol Assists For High Performance LAN Connections", by Ratcliff et al; U.S. Pat. No. 6,014,699, Issued Jan. 11, 2000, entitled "Internet Protocol Assists For High Performance LAN Connections", by Ratcliff et al; U.S. Pat. No. 6,009,467, Issued: Dec. 28, 1999, entitled "System For Checking Status Of Unsupported Functions Of Communication Platforms At Preselected Intervals In Order To Allow Hosts To Obtain Updated List Of All Supported Functions", by Ratcliff et al; U.S. Pat. No. 6,003,088, Issued: Dec. 14, 1999, entitled "Blocking IP Datagrams In A Multi-Path Channel Point-To-Point Environment" by Houston et al: U.S. Pat. No. 6,006,261, Issued Dec. 21, 1999, entitled "Internet Protocol Assists Using Multi-Path Channel Protocol" by Ratcliff et al; pending application Ser. No. 08/920,533, entitled "Communication Method And Apparatus for Use In A Computing Network Environment Having High Performance LAN Connections" by Ratcliff et al; U.S. Pat. No. 6,023,734, Issued: Feb. 8, 2000, entitled "Establishing Direct Communications Between Two Hosts Without Using A High Performance LAN Connection" by Ratcliff et al; allowed application Ser. No. 08/924,022, Allowed: Sep. 2, 1999, entitled "Establishing Direct Communications Between Two Hosts Without Using A High Performance LAN Connection" by Ratcliff et al; U.S. Pat. No. 5,987,515, Issued: Nov. 16, 1999 entitled "Internet Protocol Assists Using Multi-Path Channel Protocol" by Ratcliff et al; U.S. Pat. No. 6,003,080, Issued: Dec. 14, 1999 entitled "Internet Protocol Assists Using Multi-Path Channel Protocol" by Ratcliff et al; and U.S. Pat. No. 6,084,859, Issued: Jul. 4, 2000, entitled "Internet Protocol Assists Using Multi-Path Channel Protocol" by Ratcliff et al; all applications filed on Aug. 29, 1997 and assigned to the same assignee as the present application.

FIELD OF INVENTION

The present invention is generally directed to an expanded control command interface that can support network connections to gateway devices without dealing with configuration complexities.

BACKGROUND OF THE INVENTION

Personal computers are gaining widespread popularity as the state of technology is improving. Over the past few decades, their utilization has profilerated both for personal purposes and for use in business and scientific communities. Establishing good computing communications have become a necessity as individual users try to connect to one another for exchange of information, and to larger computers to take advantage of their higher processing capabilities. This need to communicate between different computing hosts or nodes have evolved into the creation of distributed networks. A distributed network is an aggregate of individual systems that are connected to one another electronically. Distributed networks can be organized in a number of ways, either remotely extending over great distances using wide area networks or WANs, or locally through the use of a Local Area Network, better known as a LAN.

A LAN usually consists of a number of nodes or hosts located within an office, a building or at other close proximations. Being a type of a distributed network, a LAN loosely couples processors and workstations. Generally, workstations on a LAN do not share a central memory but do share common servers. In this way a LAN increases the power and flexibility of workstations by enabling them to access shared data without jeopardizing the security of each individual resource.

A LAN system that has been in wide use in recent years is produced by Novell, Inc. of Provo, Utah. In a Novell system, a LAN device driver is implemented on top of the local operating systems to be coupled and device driver commands at the LAN workstations are directed to and from the workstations onto the LAN to the target servers.

As networks have grown and particularly as LANs have come into widespread use, many businesses and organizations have faced the necessity of interconnecting and managing a confederation of networks and LANs. Each network itself can in turn be comprised of a plurality of logical networks which in turn run independent and different networking protocols. The challenge has not become only to interconnect local area networks to one another, but to do so and still provide remote server access through WANs or other devices.

Three basic methods are now available to interconnect both local and remote area networks to one another as to provide wide used access and remote information exchange capabilities.

These three methods are 1) bridges or data-link devices that connect similar networks together; 2) routers that perform routing services by maintaining a routing table in each host; and 3) gateway devices that carry out protocol conversions and other connectivity functions. Typically, a device driver for the gateway is provided with modems or other physical ports that can be linked to switched communication WANs.

A gateway facility allows the interconnection of multiple independently controlled communication networks to one another in a way that logical units in the network can communicate with one another without any changes to the network. A logical network runs a single networking protocol, but a processing organization can be composed of a dozen of logical networks running six or seven networking protocols. A gateway provides transparent interconnection of these single networking protocols, so that a single multiport transport network is formed.

In the existing mechanisms, gateway devices are implemented on top of the LAN device drivers as a switched communications device interface. The user initialization of the communication link-up procedure redirects the user hardware commands to the gateway. The communications interface in the gateway driver then institutes and maintains the switched communications link, diverting hardware resources of the driver to do so. The connection and access procedures are then executed using the gateway ports and modems in order to link the user's system with the switched communications network. A remote connection is established through the LAN/WAN which sets up a point to point configuration through the port along the communication line between the user and the communications device in use.

The procedure described above has many complexities associated with it. The complexities connected with the configuration assessment of gateway devices is an on-going concern of the designers of such devices today. These configuration concerns contributes to many limitations that exist with today gateway devices. These limitations often make the interconnection of networks running different protocols non-transparent. Because many of the present gateways are transport layer protocol-specific, it is possible that a gateway cannot interconnect a network running for example a TCP/IP protocol and a network running the SNA protocol. Furthermore, a variety of gateway devices have been developed which connect TCP/IP to different operating system and give connectivity to the LAN/WAN environments, but each time the configuration has to be redefined and reassessed before connectivity is accomplished successfully. Furthermore, each gateway device can usually implement only a subset of the TCP/IP functions. Most currently existing gateway devices do not support many of the TCP/IP functions and performance problems have been encountered due to increased bandwidth of the LAN/WAN arenas. One of the communication protocols used to communicate with the gateway is LCS or LAN Channel Station. A control command interface exists in the LCS protocol that requires all the configuration information to be set prior to the TCP/IP connect sequence. Nonetheless, the control interface does not have a command sequence to enable the use of the TCP/IP functions which have been implemented in the gateway devices. To reduce the complexity of configuring gateway devices, an expanded control command interface is needed.

This application is being filed with the following related applications on the same date—attorney dockets:

SUMMARY OF THE INVENTION

In a computing network environment having a gateway device electronically connected to a plurality of hosts potentially connected to one or more routers and local area networks, a method and apparatus is provided for dynamically configuring, deconfiguring and monitoring all connected hosts. During an initialization step, using handshaking techniques, addresses of all connected hosts to the gateway device is first determined. All the configuration information determined during the initialization step is then stored in a routing table in a memory location accessible to the gateway device. Every time a host is added to the environment, the host is registered as a new entry in the routing table. From then on, every time communication needs to be established between the hosts, including the new host, a special IPX command is issued which contains information about each of connected hosts' IP(X) sessions, router information and IP(X) packets and their final destinations, and connection routes.

In another embodiment of the present invention the IPX command is also used to receive information and pass information about new IPX stations in the network environment.

This is done by building a corresponding IPX packet for each new IPX station and providing information about this new route and consequently updating this new information in the routing table using the new IPX station. Duplicate entries are also kept in the routing table which are then sorted in some special order so as to provide information about shortest paths available to each host in the network. By providing a counter and incrementing it each time an IPX packet is received from the network, the most used entries are identified. This requires periodically sorting the routing table entries with the highest hit counts and placing them first and then resorting them.

A second special IP(X) host command is also provided for deconfiguring and removing entries from the routing table in a manner similar to the one described above.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
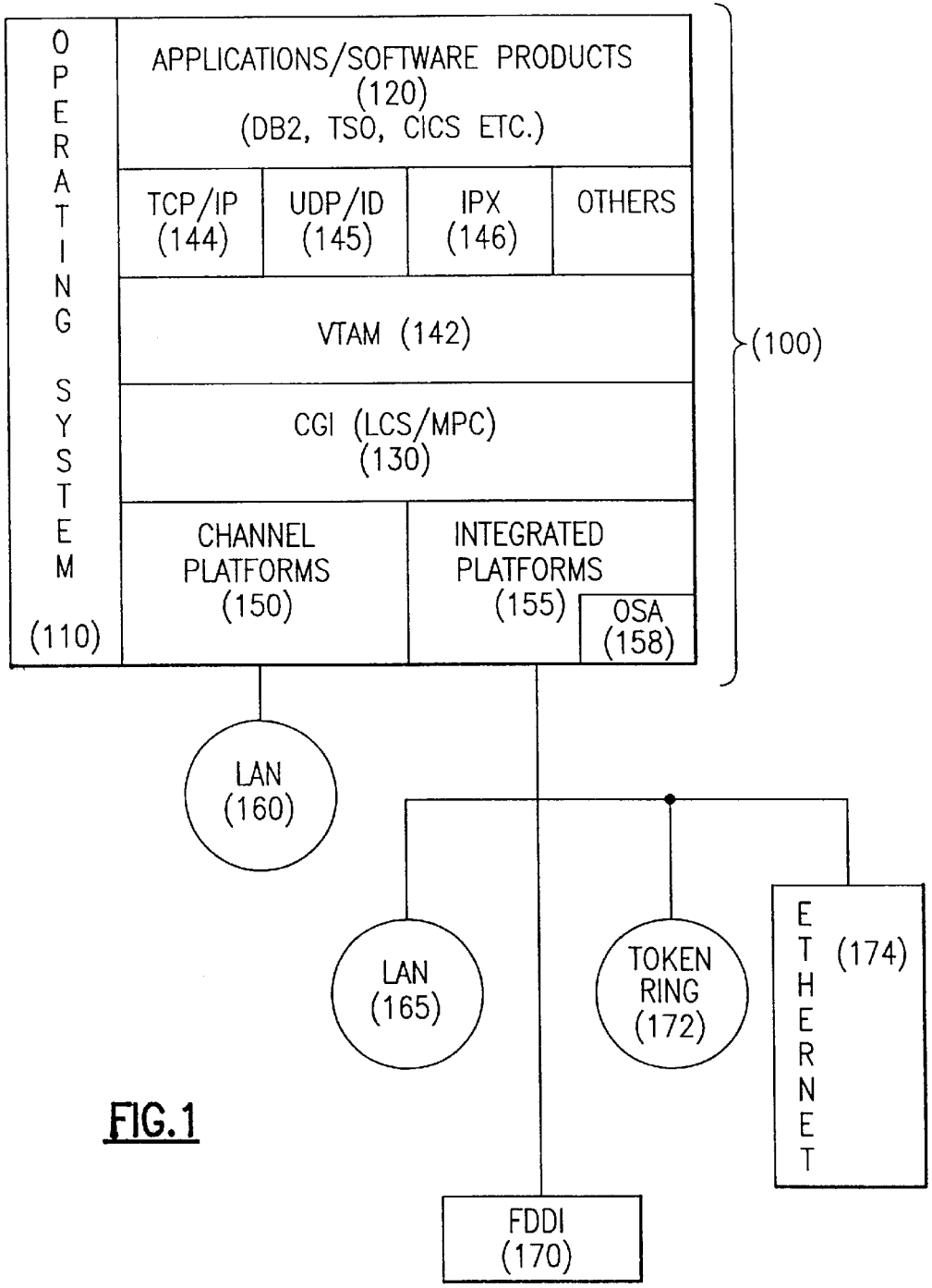
FIG. 1 is a block diagram illustration of a computing environment.

FIG. 1 is an illustration of an example showing the connection of large computing network environment, such as one provided by a large mainframe computer, to a Local Area Network (LAN) and the Internet. The large rectangle in FIG. 1 shown at 100 is a computing network environment such as an IBM S/390 computer. The operating system(s) for the computing environment is shown as 110 and can be one of many available operating systems such as OS/390 or MVS/ESA. At the next layer, shown at 120, the software products and applications reside, some examples being DB2, TSO, CICS, and IMS. The Common Gateway Interface or CGI is shown at 130 and interfaces with the communication devices such as an IBM Internet Connection Server, to access VTAM (shown at 142), TCP/IP (shown at 144), IPX (shown at 146) or other similar communication protocols. The network connection to the LAN and/or Internet (shown at 160–174) can be accomplished by means of any indicated communications controller or such as an Open Systems Adapter connection, hereinafter OSA. The network connection from the computing environment servers can be a channel (150) or an integrated platform (155) connection. An Open System Adapter or an OSA shown at 158 is an integrated connectivity platform and a product of IBM Corp. of Armonk. OSA provides direct attachment to token ring (shown at 172), ethernet (shown at 174), FDDI's or fiber distributed data interfaces, and ATM (not shown). Multiple host systems can be accessed from a single workstation through a single OSA LAN/WAN port. Integrated on the OSA card is a channel adapter, a control unit and LAN adapters. OSA supports a variety of communication protocols, namely SNA/APPN, TCP/IP and IPX. OSA allows the sharing of applications and/or LAN ports among logical partitions.

There are many protocols used to connect the communication stacks, for example an MVS TCP/IP Stack to a channel attached platform or an integrated platform such as the OSA. One such platform protocol is known as an LCS or LAN Channel Station. LCS provides an efficient method of transferring data across the I/O subsystems by blocking multiple LAN frames together in one common chain. In the following sections, the teachings of the present invention may be described in reference with a system using OSA and LCS to communicate with the MVS operating system in a setup using TCP/IP. However, the workings of the present invention is not limited to the use of OSA, LCS, TCP/IP and MVS and any such reference will be used for demonstrative purposes only.

A variety of gateway devices have been developed which connect to TCP/IP and give connectivity to LAN/WAN environment.

In the existing systems, when a host is communicating with a LAN or other similar networks a Media Access Control Header, also known as a MAC Header, along with the LAN type, has to be first established so that the host and the LAN understand what kind of device and at what address the communication is being determined to address the particular needs of one another. Building a MAC header is not an easy task. In a large communicating environment, each time the host and LAN devices communicate a MAC Header has to be created which can be both inefficient in terms of time and memory consumption. Each time communication is to be established information including the device(s) address on both the sending and receiving ends, MAC header, LAN type, device type, protocol versioning and the like has to be exchanged. This process requires substantial spending of both time and memory. The present invention, however, introduces a concept which makes the formation of MAC headers and providing of such aforementioned information each time between the initiating host and receiving device obsolete. This will save latency, memory capacity and introduces efficiency on memory moves especially on the initiating host's side. The host no longer has a requirement to know any LAN/WAN specific information.

Figure 2:
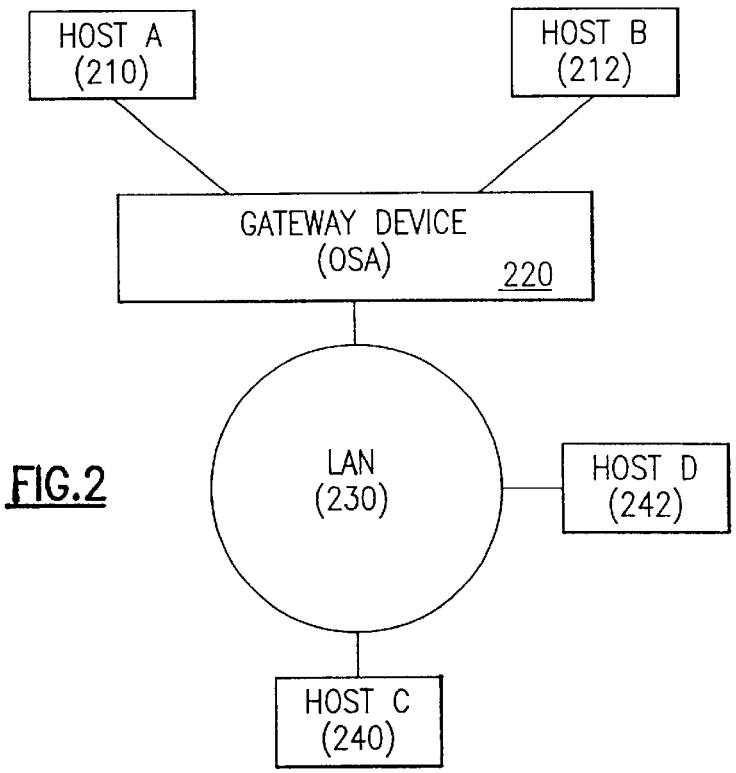
FIG. 2 is another block diagram illustration of a computing environment having a gateway device and a plurality of hosts.
Figure 3:
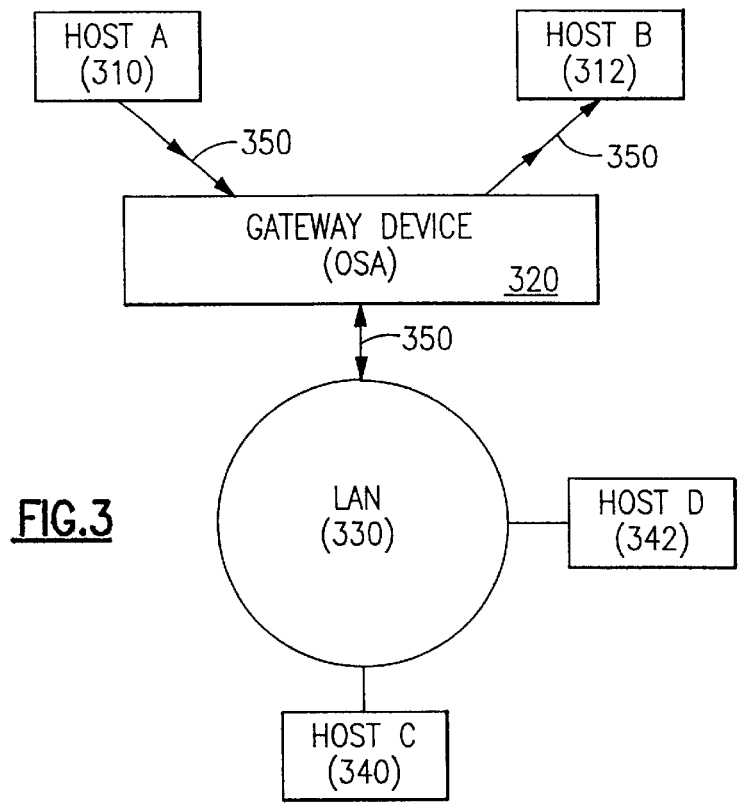
FIG. 3 is another illustration of the block diagram shown in FIG. 2 with arrows indicating the existing flow of information.
Figure 4:
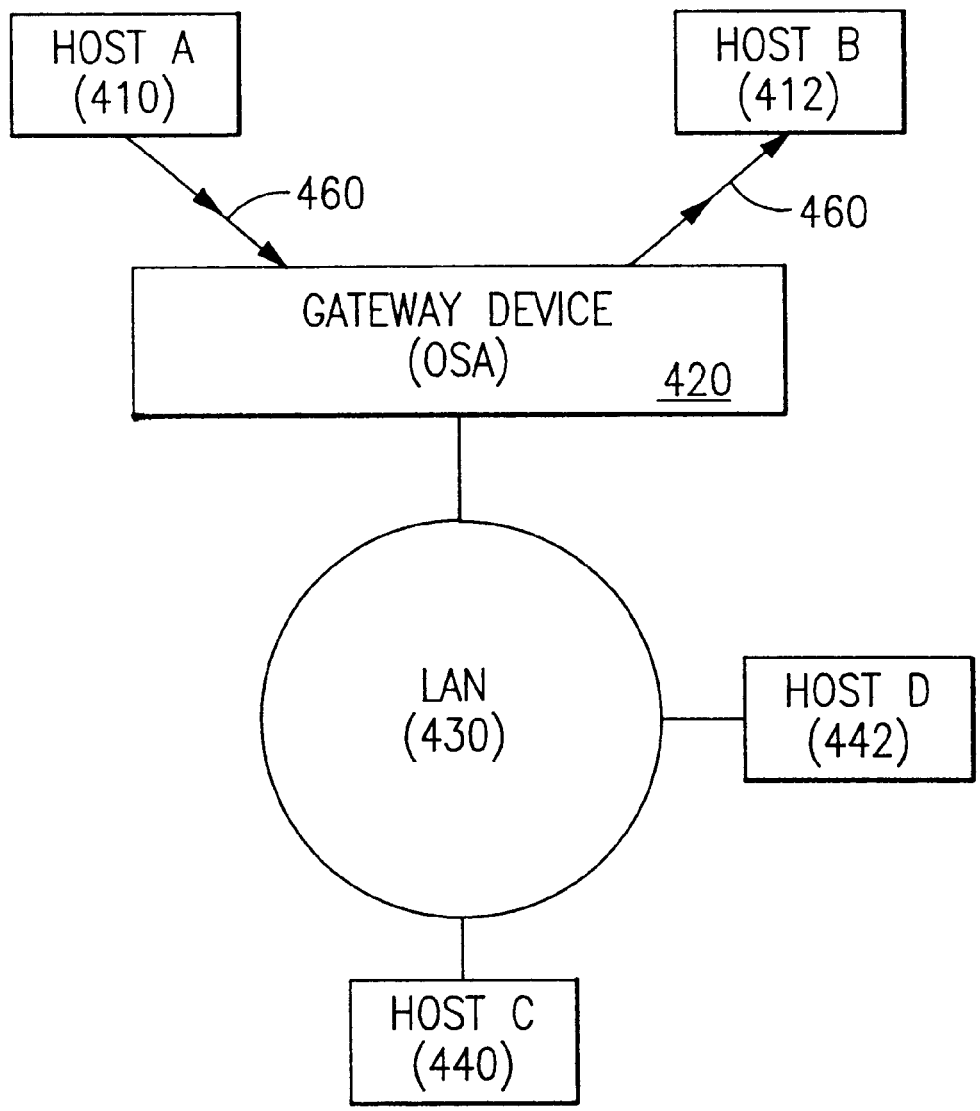
FIG. 4 is another illustration of the block diagram shown in FIG. 2 with arrows indicating the flow of information according to one embodiment of the present invention.

FIG. 2 depicts one embodiment of the present invention. Originating hosts A and B shown at 210 and 212 are connected to a gateway device, preferably an integrated gateway device such as an OSA and shown at 220. The destination hosts C and D shown at 240 and 242 are also connected via the LAN shown at 230 to the gateway device. In the existing systems when originating hosts A and B try to establish communication with destination hosts C and D, the appropriate MAC Header has to be formed first for each communication. Another existing limitation in the present system is that if host A is trying to communicate with host B, the information has to travel from host A into the gateway device and onto the LAN as depicted by the arrows shown in FIG. 3 at 350 before being transformed to Host B. The present invention, however, provides for a technique so that the information from Host A can be provided to Host B without going to the LAN at all as depicted in FIG. 4 and indicated by the arrows shown at 460.

In the present invention whenever each host gets connected to the gateway device, it sends the required address information as a configuration command to the gateway device during an initial handshaking at the onset of establishing communication with the gateway device. It is the gateway device itself that uses the configuration command and controls the communication from that point on. Referring back to FIG. 2, destination hosts C and D continuously are aware of the IP addresses and requirements of the gateway device. Destination hosts C and D obtain the destination MAC addresses of initiating hosts A and B directly from the gateway device, not from Hosts A and B. Hosts A and B have no knowledge of the media specific information or address resolution. Hosts C and D only know about the gateway device address. In other words hosts C and D only know hosts A and B through the gateway device. The same is true about hosts A and B in that they are not aware of independent existence of C and D except through the use of the gateway device. As a consequence, there is no need to define the type of device or the LAN type and protocol versioning each time the communication is being established. In the present invention there are tables existing in the gateway device that are used to make the device aware of all the host/LAN/WAN connections and their special needs. Every time, for example host A is trying to communicate with host C, the gateway device searches in its table of addresses to find the address of A and C so that communication is carried out successfully. But the gateway device is also aware, through the use of its previously stored information of the type of LAN that is connected to device C, any limitations and particular needs that device C has as well as the type of communication protocol needed for device A to communicate with device C. Every time a LAN or host is being newly added, the present invention through an initialization step introduces the device and stores any pertinent information that is needed for further communications. From that point on, once the host becomes connected to the gateway device, the gateway device remains aware of all its requirements. The gateway device also checks the availability and existence of the device connections and their workability, at intervals to monitor and ensure that the device is still available. If the device is no longer in use, the gateway device makes the appropriate alterations to the table(s) in question.

In the existing systems there is a configuration file attached to each communication platform that controls all configuration information. It is the responsibility of the user to keep this configuration file updated. Any new addition or deletion of hosts must be inputted by the user and there is no way that modifications and alterations can be handled automatically. The present invention, however, as explained earlier dynamically and automatically handles alterations, additions and modifications to the configuration through the use of commands explained in detail below and through the use of specially accessed tables.

Figure 5:
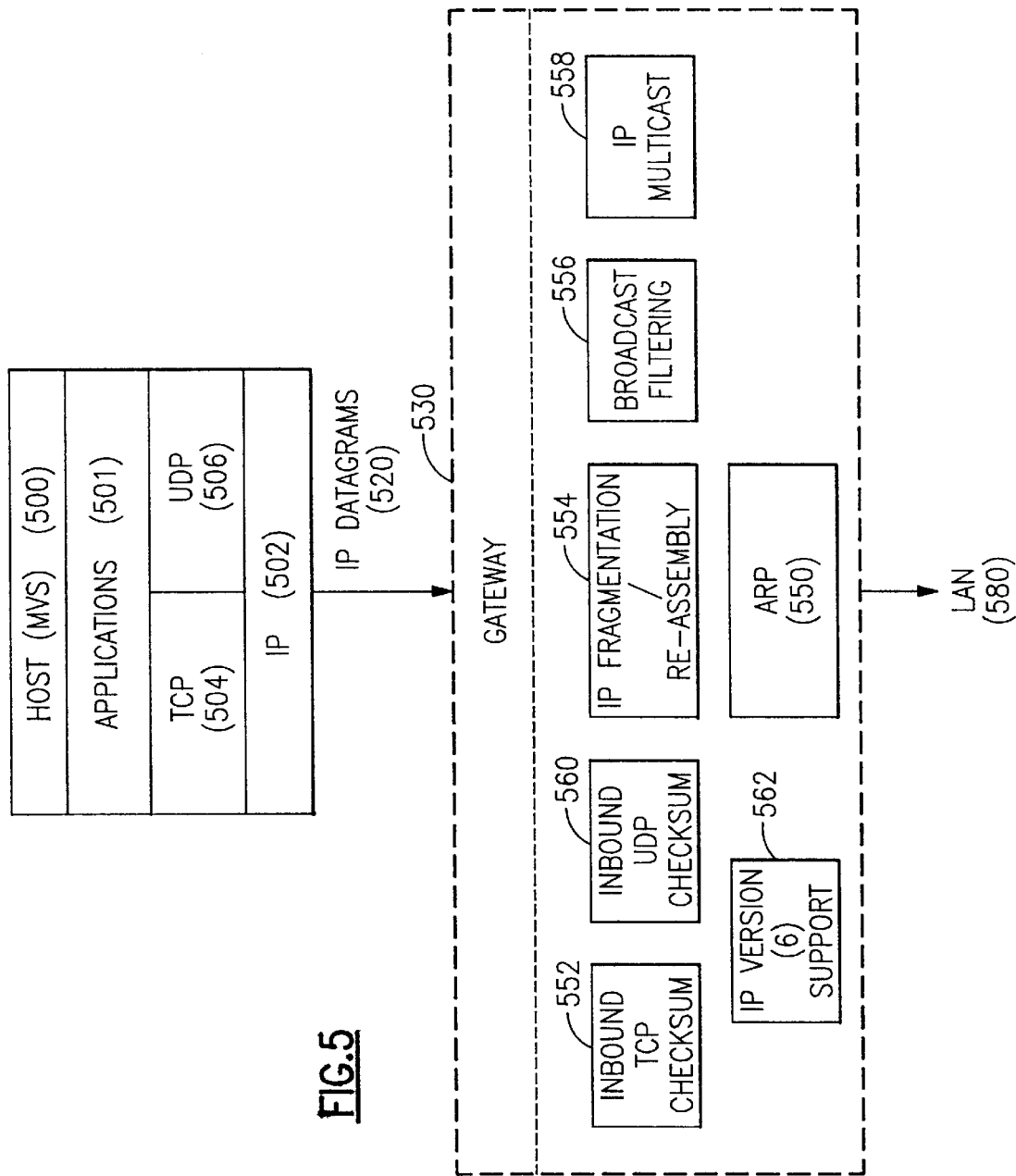
FIG. 5 is yet another block diagram illustration of a computing environment providing different functions as supported by the environment.

FIG. 5 is an illustration of the workings of a related invention incorporated by reference which aid the understanding of the workings of the present invention. The host and its operating system and applications is shown at 500 and 501 respectively. The IP protocols are shown at 502 (IP) and TCP and UDP at 504 and 506, respectively. The TCP/IP or UDP/IP functions available are shown at 550—ARP, 552—Inbound TCP checksum, 554—IP fragmentation/reassembly, 556—broadcast filtering, 558—IP multicast, 560—Inbound UDP checksum and 562—IP version support (Version 6 is used as way of example). The communication protocol options presented at 550–562 are merely for demonstration purposes and it is possible to add or modify this list according to each particular setup and mechanism. For example in an alternate embodiment of the invention described below, SAP and RIP functions are among the functions that are supported. The LAN connection is shown at 580 and the gateway connection at 530.

In such setups, usually a control command interface exists in the gateway device to allow TCP/IP or other protocols to connect to the gateway device in order to begin data transfers. However, this control command interface requires all the configuration information to be set prior to the TCP/IP connect sequence. Furthermore, the control interface does not have a command sequence to enable the use of the TCP/IP functions which have been implemented in the gateway device. The TCP/IP program product running on such operating systems as MVS and VM/VSE have been developed by a number of companies. But many of today's TCP/IP implementations have encountered performance problems due to the increased bandwidth of the LAN/WAN arenas. To try and improve the MVS and other similar operating system's performance using TCP/IP or other communication protocols, various TCP/IP functions have been identified which could better be implemented in a gateway device which has LAN/WAN connectivity. Some of these functions include ARP assist, TCP and IP checksum calculations, broadcast filtering and IP fragmentation and reassembly. To reduce the complexity of configuring the gateway devices, the present invention introduces an expanded control command interface. This will allow gateway devices to implement most TCP/IP functions and provide means for determining which TCP/IP functions are supported by the gateway device, if any.

The present invention provides for an expanded control command interface to reduce the complexity of gateway device configurations and address the limitations. Two commands are provided in particular: IPXBINDNET command and IPXUNBINDNET command.

The IPXBINDNET command is used to add and recognize an entry to the network. The IPXBINDNET commands can contain particular information such as the IPX Network Number, Hop Count and Tick Count among others. The Network Number is used to identify the specific IPX session in the Network. It is analogous to the IP Address in the TCP/IP. The Hop Count is the number of IPX Router through which the IPX packet would pass to reach the final destination. The Tick count is used to identify routes which would go over slower connections.

The IPXUNBINDNET command is used to remove an entry. The IPXUNBINDNET command contains the IPX Network Number to be removed.

In one embodiment of the present invention a Routing Table is built using the IPXBINDNET and IPXUNBINDNET commands from a device driver such as IBM's OS/390 IPX Device Driver. The OSA IPX Routing Table can be indexed using different algorithms as known to the persons skilled in the art. A preferred algorithm used is a Hashing algorithm on the IPX Network Number. The Routing Table can also contain a Collision Chain for multiple entries which Hash to the same OSA IPX Routing Table index. The OSA IPX Routing Table can also contain a Duplicate Chain for mapping entries which contain the exact same IPX Network Number from different OS/390 IPX Device Drivers. (Techniques such as Collision Chaining and Duplicate Chaining are well known to the person skilled in the art and outside the scope of the present invention.) The IPXBINDNET is used in this way to add any entry to the IPX Routing Table. Similarly, the IPXUNBINDNET command is also used to remove an entry from the IPX Routing Table.

Figure 6:
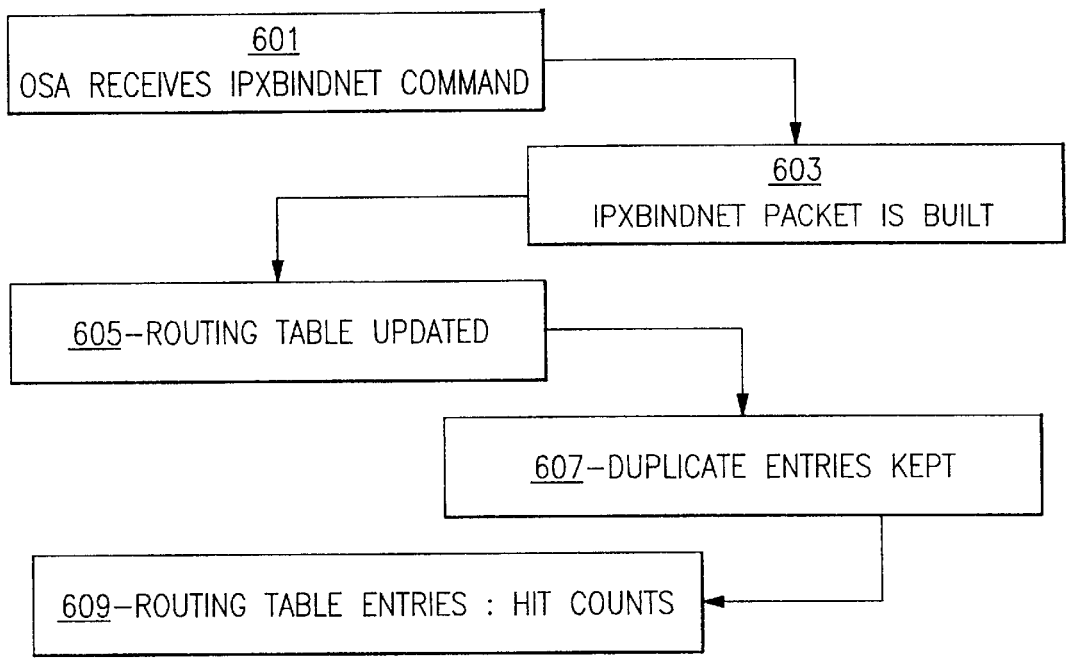
FIG. 6 is a chart showing the flow of information using an IPXBINDNET command.

FIG. 6 is a chart, according to one embodiment of the present invention, explaining the flow of information using the IPXBINDNET command. 601 describes how an OSA receives IPXBINDNET commands as the OS/390 IPX Router to which is it connected learns of new IPX Stations in the Network. The IPX Routers exchange this information using an IPX Routing Information Protocol (hereinafter, RIP) packet. Step 603 describes how for each RIP packet received by the OS/390 IPX Router, a corresponding IPXBINDNET packet is built to inform OSA of the new route.

Step 605 reflects the updating of OSA Routing table with the new information. The OSA Routing Table also contains other information such as the Network Number, Hops and Ticks counts. One of the advantages of this implementation is that OSA can have connections to multiple different OS/390 IPX Routers. Since each OS/390 IPX Router can be connected to different Networks, OSA must always route the inbound packets to the OS/390 IPX host which has the least number of hops to the destination IPX Network Number. OSA then keeps the "duplicate" entries in its routing table, preferably in sorted order as reflected in step 607. The OS/390 IPX Router which has the shortest path to the Network will have its entry first in the OSA IPX Routing Table. Since the index into the OSA IPX Routing Table is computed using a hashing algorithm, it is possible for different IPX Network Numbers to "hash" the same index. The OSA IPX Routing Table contains a "collision Chain" to link these entries with the base index. As shown in step 609, the OSA IPX Routing Table entries contain a hit count. This count is incremented each time an IPX packet is received from the network which contains the matching IPX Network Number. Periodically, the collision chains are sorted to have the entries with the highest "hit" counts placed first in the "Collision Chains". Once the entries are re-sorted, the hit counts are cleared. This process keeps the most used entries first in the chain to make the searching more efficient for these entries.

In case of IPXUNBINDNET command which is used to remove entries, a similar procedure is utilized. Entries are removed when either the OS/390 IPX Router terminates or the Network to which the IPX Router is connected loses its path to the IPX Network. When an entry is removed from the OSA IPX Routing Table, if a "Duplicate" entry for the IPX Network Number exists, it will automatically become the active entry for the IPX Network Number. Since the entries are always kept in sorted order, the next entry is always guaranteed to have the next best route.

Figure 7:
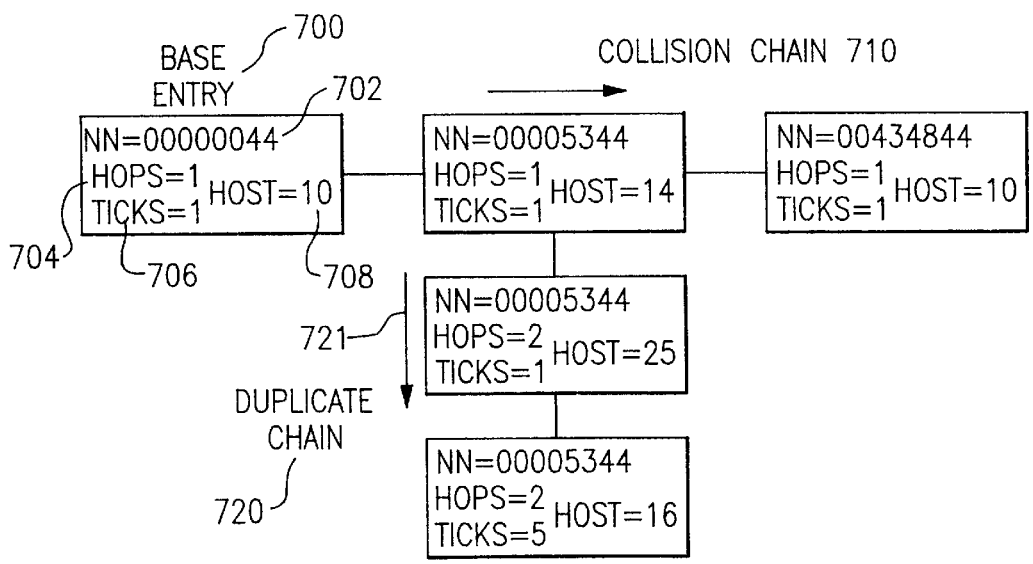
FIG. 7 is an illustration of Collision Chain entries.

FIG. 7 provides a more detailed view of Collision Chain 710 and Duplicate Chain 720. As indicated each Base entry shown at 700, also provides the IPX Network Number NN (702), a Hops number (704) and a Tick number (706). The address of the host is also provided (708). The entries along the arrows 721 of Duplicate Chain 720, all share the same NN or IPX Network number.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. In a computing network environment having a gateway device and a plurality of hosts potentially connected to one or more routers and local area networks, said hosts being electronically connected to said gateway device, a method of dynamically configuring and monitoring all hosts connected to said gateway device, said method comprising the steps of:

performing an initialization step during which using handshaking techniques addresses of all connected hosts to said gateway are determined;

providing a routing table and storing said table in a memory location accessible to said gateway device;

providing from a device driver of a router a special Internetwork Packet Exchange protocol (IPX) command every time said router learns a host is added to said environment;

providing as part of said special IPX command information about all said connected hosts' IPX sessions with other hosts, router information to other connected hosts and the final destinations of IPX packets, and connection routes of one host connected to another host;

registering all new entries in said routing table, each entry representing a route to a host from the gateway device;

said registering all new entries in said routing table comprising the steps of;

receiving at the host who learns of a new IPX station, information and passing to the gateway device, information about new IPX stations in said network environment using said IPX command;

building at each host connected to said new IPX stations, a corresponding IPX packet for each new IPX station and providing to the gateway device, information about this new route;

updating by said gateway device, said routing table with new information about routes to said new IPX station;

keeping duplicate entries representing duplicate routes in said routing table, each entry having a Tick count comprised of a value indicating the path length of the route, and sorting them in Tick count order so as to provide information about shortest paths available to each host in said network;

providing a counter at said gateway device and incrementing said counter to determine a Hit count each time an IPX packet is received from said network over a route which contains a matching IPX network number and recording said Hit count in the entry corresponding to said route;

periodically sorting said entries so as to provide entries with the highest hit counts and placing them first; and resorting said entries and clearing said hit counts so as to keep the most used entries first so as to provide more efficient searching.

2. The method of claim 1, wherein said IPX command and provides IPX Network Number, Hop Count and Tick Count for each of said hosts.

3. The method of claim 2, wherein said routing table is indexed using a hashing algorithm on the IPX Network Number.

4. The method of claim 3 wherein said routing table comprises a collision chain for multiple entries which hash to the same said index.

5. The method of claim 4 wherein said routing table also comprises a duplicate chain for mapping entries which contain the same IPX Network Number from different device drivers.

6. The method of claim 1, wherein said special IPX command is an IPXBINDNET command.

7. The method of claim 1, wherein said IPX routers exchange new IPX stations information using an IPX Routing Information Protocol packet.

8. The method of claim 1, wherein said routing table contains Network Number, Hops and Tick counts.

9. The method of claim 1, wherein multiple connections to multiple IPX routers can exist in same or a different host partition(s).

10. The method of claim 9, wherein same routing information from multiple different IPX routers can be received from different IPX routers each connecting to different networks.

11. The method of claim 1, wherein inbound packets to IPX hosts is always routed to the hosts with least number of hops to a destination IPX Network Number.

12. The method of claim 1, wherein duplicate entries are sorted and any IPX router which has the shortest path to said network will have its entry first in said routing table.

13. The method of claim 1, wherein an index into said routing table is computed using hashing algorithm.

14. The method of claim 13, wherein it is possible for different IPX Network Numbers to hash to same index and said routing table provides for a Collision Chain to link these entries with same base index.

15. The method of claim 14, wherein said Collision chains are periodically sorted to have said entries with highest "hit" counts placed first in said chains and said Collision chains are cleared once said entries are re-sorted.

16. In a computing network environment having a gateway device and a plurality of hosts potentially connected to one or more routers and local area networks, said hosts being electronically connected to said gateway device, a method of dynamically deconfiguring all hosts that are no longer connected to said gateway device, said method comprising the steps of:

performing an initialization step during which using handshaking techniques addresses of all connected hosts to said gateway are determined;

providing a routing table containing configuration information about all said connected hosts, entries in said routing table corresponding to a route in the network environment, all entries in said routing table sorted so that when one entry is removed, the next entry comprises the next best route in the network environment;

storing said table in a memory location accessible to said gateway device;

providing from a still connected host to said gateway device, a special internetwork Packet Exchange protocol (IPX) command every time a host is no longer connected to said environment;

providing as part of said special IPX command information about all said connected hosts' IPX sessions, router information and IPX packets and their final destinations, and connection routes for the host which is no longer connected;

removing from said routing table, entries corresponding the connection routes provided in said special IPX command.

17. The method of claim 16, wherein said entries are removed when an IPX router is terminated.

18. The method of claim 16, wherein said entries are removed when an IPX router loses its path to an IPX Network.

19. The method of claim 16, wherein said IPX command provides IPX Network Number, Hop Count and Tick Count for each of said hosts.

20. The method of claim 19, wherein when an entry is removed from said routing table, if a duplicate entry exists for said IPX Network Number, that entry will automatically become an active entry for said IPX Network Number.

21. The method of claim 16, wherein said special IPX command is an IPXUNBINDNET command.

22. In a computing network environment having a gateway device and a plurality of hosts potentially connected to one or more routers and local area networks, said hosts being electronically connected to said gateway device, an apparatus for dynamically configuring and monitoring all hosts connected to said gateway device, said apparatus comprising:

a routing table in said gateway device for storing addresses of all connected hosts to said gateway;

a special Internetwork Packet Exchange protocol (IPX) command issued from a device driver of a router to said gateway device every time said router learns a host is added to said environment in order to update said routing table;

said special IPX command providing information about all said connected hosts' IPX sessions with other hosts, router information to other connected hosts and the final destinations of IPX packets, and connection routes of one host connecter to another host, each entry representing a route in said network to a connected host;

said gateway device receiving and registering in said routing tables, information about new IPX stations in said network environment using said IPX command;

a corresponding IPX packet built at each host connected to each new IPX station and providing to said gateway device, information about this new route, said IPX packet including a Tick count having a value representing the length of this new route;

means in said gateway device for updating, routing and sorting said entries about said new IPX station;

said routing table being sorted in Tick count value order so as to provide information about shortest paths available to each host in said network;

a counter in said gateway device incremented to determine a hit count each time an IPX packet is received from said network which contains a matching IPX network number, said hit count recorded in the entry corresponding to the route over which the IPX packet is received;

sorters for periodically sorting said entries to provide entries in order, with the highest hit counts placed first;

said sorter, resorting said entries and clearing said hit counts to keep the most used entries first so as to provide more efficient searching.

23. In a computing network environment having a gateway device and a plurality of hosts potentially connected to one or more routers and local area networks, said hosts being electronically connected to said gateway device, an apparatus for dynamically deconfiguring all hosts that are no longer connected to said gateway device, said apparatus comprising:

a routing table containing configuration information about all said connected hosts, entries in said routing table corresponding to a route in the network environment, all entries in said routing table sorted so that when one entry is removed, the next entry comprises the next best route in the network environment;

a memory location accessible to said gateway device for storing said routing table;

said routing table also including addresses of all connected hosts to said gateway;

special Internetwork Packet Exchange protocol (IPX) command designed to provide said configuration information about any host that becomes unavailable or is no longer connected to said computing network environment;

said special IPX command containing information about all said connected hosts' IPX sessions, router information and IPX packets and their final destinations, and connection routes;

means for removing entries from said routing table corresponding to connection routes provided in said special IPX command when said host is unavailable or is no longer connected to said environment.

24. In a computing network environment having a plurality of hosts in electronic communications with a gateway device, said hosts being also potentially connected to one or more local area network(s), a method for adding and recognizing a new host in said network, said method comprising:

storing information about all said hosts in said network in a central location accessible by said gateway device;

passing from a device driver in the network to said gateway device, a special Internetwork Packet Exchange protocol (IPX) command every time a host is to be added to said network environment;

said special IPX command providing in said central location new information about said host to be added;

providing as part of said special IPX command a Network Number area for identifying a specific IPX session in said Network;

providing as part of said special IPX command a Hop Count area for storing a value representing the number of IPX routers through which IPX packets would pass in order to reach their final destination; and providing as part of said special IPX command a Tick Count area for storing a value indicating the path length of the route over which said IPX packets travel.

25. The method of claim 24, wherein said command is an IPXBINDNET command.

26. The method of claim 24, wherein said command is used for removing a host from said network.

27. The method of claim 25, wherein said command is an IPXUNBINDNET command, removing an IPX Network Number of said host to be removed from said network.

28. The method of claim 24, wherein a Routing Table is built using said special IPX command.

29. The method of claim 24, wherein a Routing Table is built using said special IPX command device drivers in said network.

30. The method of claim 28, wherein said Routing Table can be indexed using different algorithms.

31. The method of claim 30, wherein said algorithm used is a Hashing algorithm.

32. The method of claim 30, wherein said algorithm used is a Hashing algorithm performed on an IPX Network Number provided by said command.

33. The method of claim 31, wherein said Routing Table includes a Collision Chain for multiple entries which Hash to same IPX Routing Table index.

34. The method of claim 32, wherein said Routing Table includes a Collision Chain for multiple entries which Hash to same IPX Routing Table index.

35. The method of claim 34, wherein said Routing Table includes a Duplicate Chain for mapping entries which contain exact same IPX Network Number from different IPX Device Drivers.

* * * * *